US006664517B2

United States Patent
Nagatomo

(10) Patent No.: US 6,664,517 B2
(45) Date of Patent: Dec. 16, 2003

(54) STEERING-HEATER DEVICE FOR VEHICLE

(75) Inventor: Hideharu Nagatomo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/189,621

(22) Filed: Jul. 8, 2002

(65) Prior Publication Data

US 2003/0006228 A1 Jan. 9, 2003

(30) Foreign Application Priority Data

Jul. 9, 2001 (JP) .................................... P 2000-207675

(51) Int. Cl.$^7$ ................................................ H05B 1/02
(52) U.S. Cl. ...................................... 219/494; 219/204
(58) Field of Search .............................. 219/200, 201, 219/202, 204, 482, 490, 494, 497, 501, 506, 507, 508, 509, 510; 74/552, 557, 558; 340/309.15, 825.69, 825.72; 439/15

(56) References Cited

U.S. PATENT DOCUMENTS 4,631,976 A * 12/1986 Noda et al. .................. 219/204
6,172,342 B1 * 1/2001 Khafagy et al. ............. 219/497
6,268,588 B1 * 7/2001 Hazebrouck et al. ........ 219/204

FOREIGN PATENT DOCUMENTS

JP         61-81274        4/1986
JP         2-262419        10/1990

* cited by examiner

Primary Examiner—Tu Ba Hoang
(74) Attorney, Agent, or Firm—Finnegan, Henderson, Farabow, Garrett, & Dunner, L.L.P.

(57) ABSTRACT

A steering-heater device 1 capable of temperature control without causing an excess current to flow into a steering wheel Sw is provided. The steering-heater device 1 includes a heater 2 disposed in the steering wheel, a calorific switching element 4 disposed in a steering column Sc to carry out switching of a drive current for driving the heater 2 and also generate heat, a thermo-sensitive element 5 for sensing the temperature of the element 4 to change its own characteristics, a control part 8 that outputs a control signal and a drive part 9 that outputs a drive signal for driving the element 4 on the ground of the control signal. Based on voltages between both ends of the element 5, the control part 8 detects an initial temperature of the steering wheel, further calculates a consumption power required to rise the temperature of the steering wheel up to a set temperature and generate the control signal during a heating period determined on the ground of the consumption power.

7 Claims, 4 Drawing Sheets

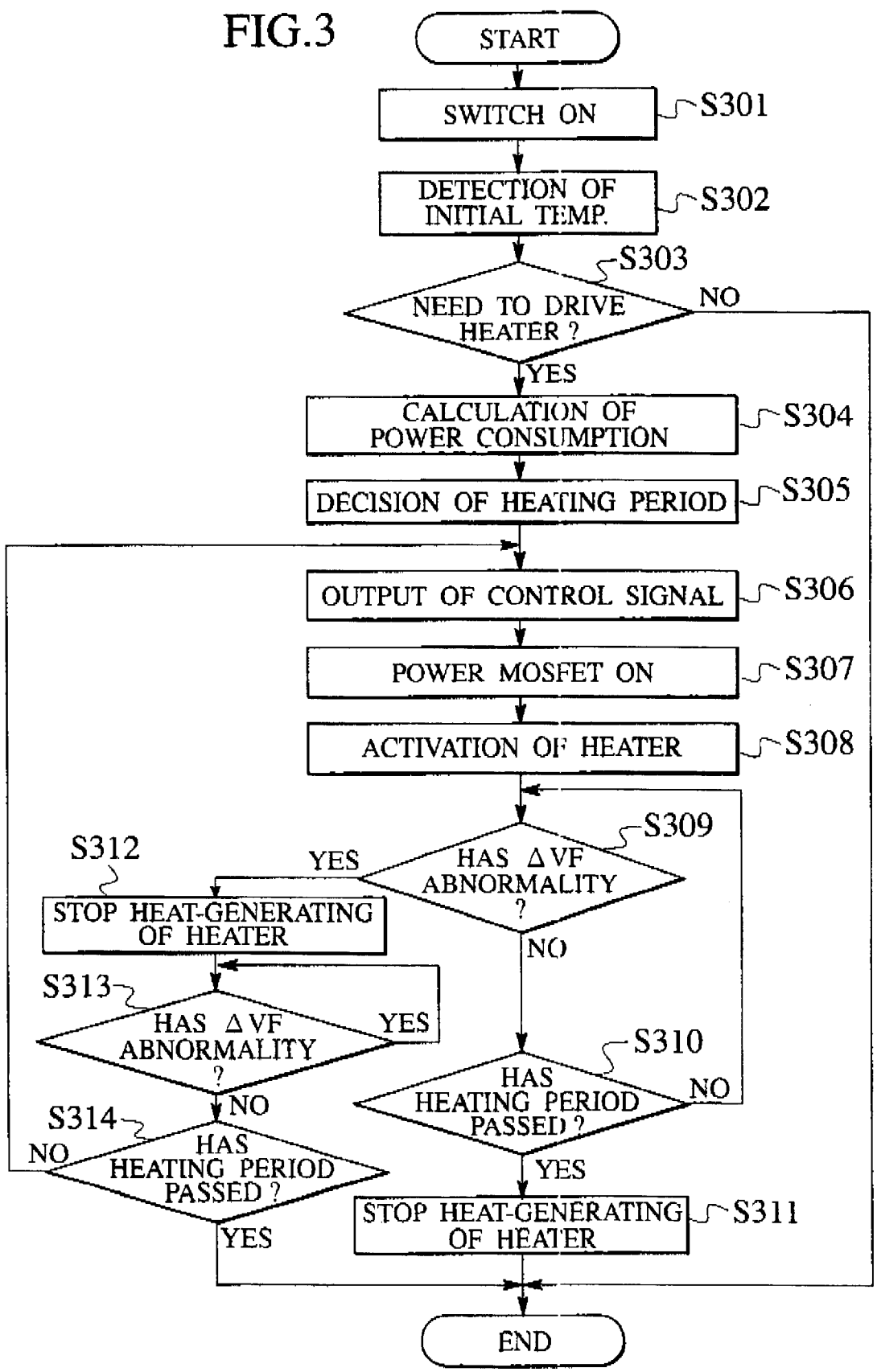

STEERING-HEATER DEVICE FOR VEHICLE

BACKGROUND OF THE INVENTION

1. Field of the Invention

The present invention relates to a steering-heater device for heating a steering wheel of a vehicle. More particularly, it relates to a steering-heater device which is capable of controlling the temperature of a heater without causing an excess current to flow into the steering wheel.

2. Description of the Related Art

Japanese Examined Patent Publication (kokoku) No. 2-30910 discloses a steering wheel whose ring part is equipped with a heating member.

In this steering wheel, there is arranged, in the vicinity of the heating member of the steering wheel, a thermistor serving as a thermo-sensitive element. In operation, the thermistor detects a temperature change of the heating member in order to carry out the temperature control for the steering wheel.

On the higher-temperature side of the heating member in the steering wheel, there is provided a fuse which is melted and broken to stop the supply of current when the temperature of the heating member rises excessively.

In the above-mentioned steering wheel, however, when a heater wire in the heating member shorts, an excess current continues to flow into the steering wheel until the fuse is melted.

In the above way, if the excess current flows into the steering wheel until the fuse is melted, then a problem arises in a possibility that a flexible flat cable (FFC) connecting the steering wheel with a steering column has an abnormality in function because the FFC has a low allowable current value.

SUMMARY OF THE INVENTION

Under such a situation, it is therefore an object of the present invention to provide a steering-heater device which is capable of controlling the temperature of a steering wheel without causing an excess current to flow into the steering wheel.

The above-mentioned object can be solved by providing a steering-heater device for a vehicle, comprising:

a heater disposed in a steering wheel of a vehicle;

a calorific switching element connected to the heater electrically and arranged in a steering column to switch the flowing of a drive current for driving the heater, the calorific switching element generating heat by the drive current;

a thermo-sensitive element arranged adjacent to the calorific switching element to sense a temperature of the calorific switching element thereby to change characteristics of the thermo-sensitive element;

a control unit connected to the thermo-sensitive element to detect an initial temperature of the steering wheel on a basis of a change in the characteristics of the thermo-sensitive element, the control unit further calculating a consumption power necessary to rise a temperature of the steering wheel from the initial temperature to a predetermined temperature and also outputting a control signal for a heating period determined on a basis of the consumption power; and a drive unit connected to the control unit to output a drive signal to drive the calorific switching element on a basis of the control signal outputted from the control unit.

According to the steering-heater device constructed above, as the calorific switching element in the steering column allows of blocking of an excess current, it is possible to prevent the excess (current from flowing into the steering wheel, thereby excluding a possibility that a connecting cable (e.g. FFC) between the steering wheel and the steering column has an abnormality in its connecting function.

As the second aspect of the invention, the above steering-heater device further comprises a drive-stop unit which detects a voltage drop of the calorific switching element due to the flowing of the drive current and makes the driving of the calorific switching element stop when no voltage drop is detected.

According to the second aspect of the invention, it is possible to prevent the calorific switching element from being still driven despite that an operational route for the heater has been opened.

As the third aspect of the invention, the calorific switching element of the steering-heater device is a power MOSFET where a voltage between gate and source thereof is established so that the drive current becomes less than a current limit for the heater.

According to the third aspect of the invention, owing to the above establishment of a voltage between gate and source of the power MOSFET, it is possible to prevent the excess current from flowing into the steering wheel, thereby excluding a possibility that the connecting cable (e.g. FFC) between the steering wheel and the steering column has an abnormality in its connecting function.

As the fourth aspect of the invention, the steering-heater device further comprises a voltage detecting unit connected to the thermo-sensitive element and the control unit thereby to detect a voltage between both ends of the thermo-sensitive element. Then, the characteristics of the thermo-sensitive element is identical to the voltage between both ends of the thermo-sensitive element.

As the fifth aspect of the invention, in the steering-heater device of the fourth aspect, the thermo-sensitive element is a thermo-sensitive diode through which a constant current flows and which senses the temperature of the power MOSFET thereby to change the voltage between both ends of the thermo-sensitive diode.

As the sixth aspect of the invention, in the steering-heater device of the fifth aspect, the power MOSFET and the thermo-sensitive element are formed into one body thereby to provide a power semiconductor having a built-in diode.

According to the sixth aspect of the invention, owing to the integration of the power MOSFET with the thermo-sensitive element, it is possible to simplify the structure inside the steering column.

As the seventh aspect of the invention, the heater is connected to the calorific switching element through a flexible flat cable.

These and other objects and features of the present invention will become more fully apparent from the following description and appended claims taken in conjunction with the accompany drawing.

BRIEF DESCRIPTION OF THEE DRAWINGS

FIG. 3 is a flow chart for explanation of the operation of the steering-heater device of FIG. 1.

DESCRIPTION OF THE PREFERRED EMBODIMENT

A steering-heater device in accordance with one embodiment of the invention will be described with reference to drawings.

Figure 1:
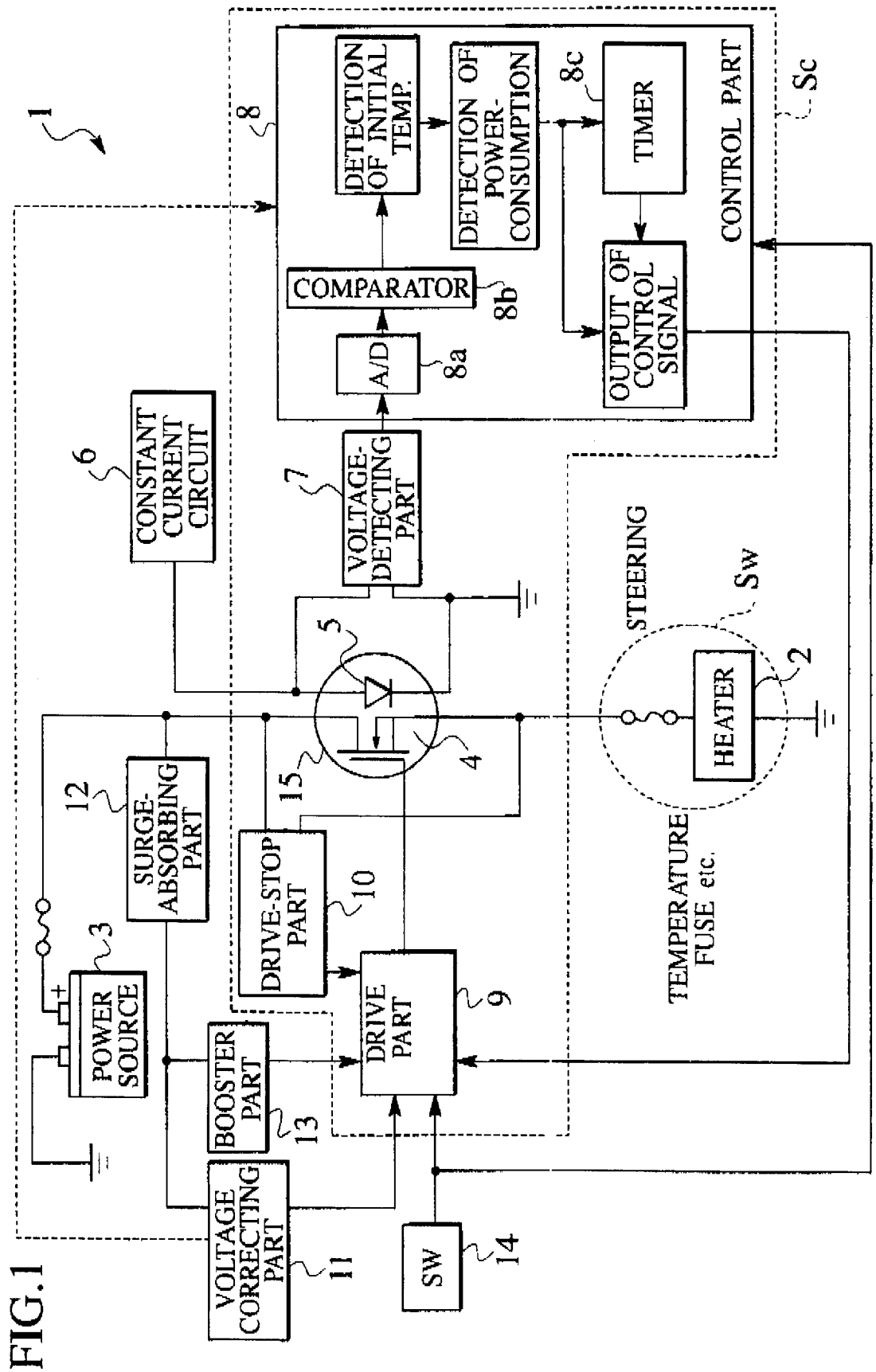
FIG. 1 is a block diagram showing the structure of a steering-heater device in accordance with an embodiment of the present invention.

FIG. 1 shows the constitution of the steering-heater device of this embodiment.

As shown in the figure, the steering-heater device 1 includes a heater 2 disposed in a steering wheel Sw, a power MOSFET 4 for switching a drive current of the heater 2 supplied from a power source 3, a thermo-sensitive diode 5 for sensing a temperature of the power MOSFET 4 to change its own characteristics, and a constant-current circuit 6 for supplying a constant current to the thermo-sensitive diode 5. The steering-heater device 1 further includes a control part (unit) 8 that calculates a consumption power required to rise the temperature of the steering wheel Sw up to a set temperature, on the ground of a voltage VF between both ends of the thermo-sensitive diode 5. The control part 8 further generates a control signal during a heating period determined on the ground of the so-calculated consumption power. The steering-heater device 1 further includes a drive part (unit) 9 for driving a gate of the power MOSFET 4 on a basis of the control signal generated from the control part 8, a drive-stop part (unit) 10 that detects a voltage Vds between drain and source of the power MOSFET 4 thereby to stop the drive of the power MOSFET 4 in case of no voltage drop, a voltage correcting part 11 for correcting a source voltage Vb, a surge absorbing part 12 for absorbing a surge voltage, a booster part 13 that raises the source voltage Vb thereby to supply it to the drive part 9 and a switch 14 to perform a switching operation between ON state and OFF state in the steering-heater device 1.

In the shown embodiment, the power MOSFET 4 is illustrated as one example of a calorific switching element. In the modification, the power MOSFET may be replaced with any element, such as power transistor, so long as it can be heated by the drive current thereby to perform the switching operation.

In the power MOSFET 4 on illustration, when establishing a voltage Vgs (between gate and source of the MOSFET 4) to an appropriate value, then it is possible to make a drain current Id (as the drive current of the heater 2) less than a current limit for the heater 2.

Figure 2:
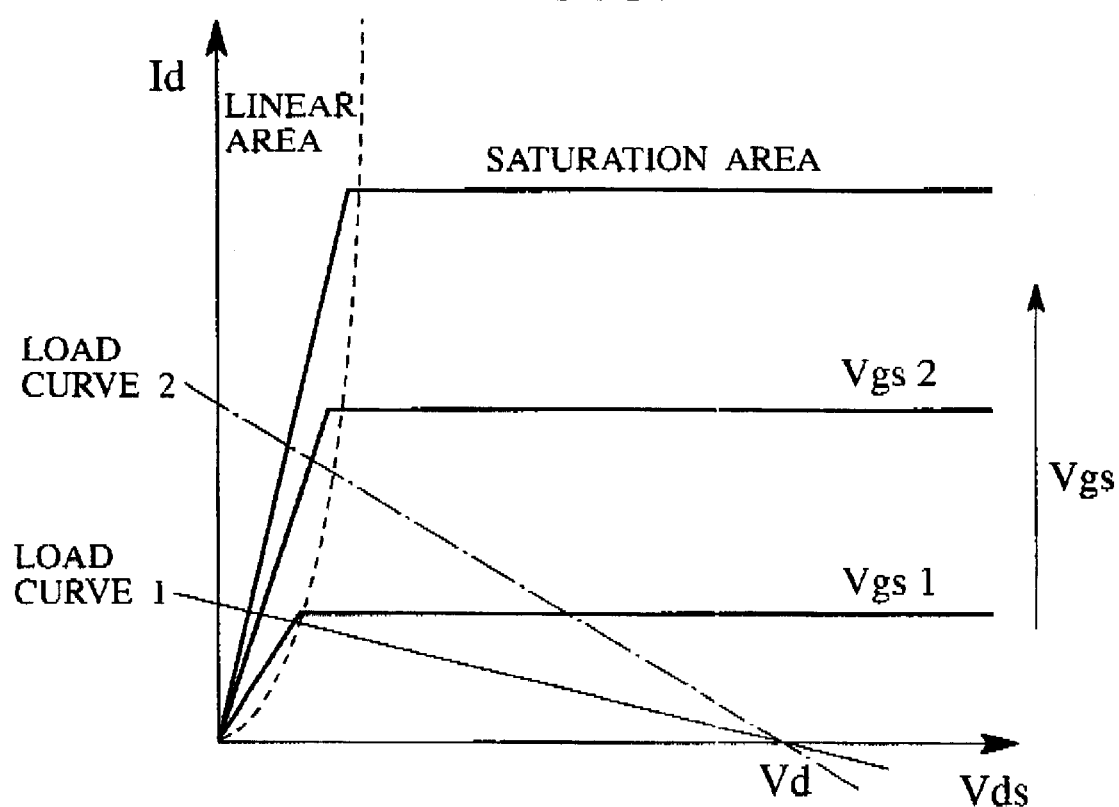
FIG. 2 is a diagram for explanation of current/voltage characteristics of a power MOSFET of FIG. 1.

With reference to FIG. 2, the current-voltage characteristics of the power MOSFET 4 will be described below.

As shown in FIG. 2, the relationship between drain/source voltage Vds and drain current Id is determined by a value of voltage Vgs. Thus, if the value of voltage Vgs grows larger, a curve representing the voltage Vgs is shifted upward.

If a value of voltage Vds increases, then a value of drain current Id is linearly increased within a linear area. Further, when a value of voltage Vds increases into a saturation area, then the value of drain current Id becomes constant.

Therefore, the establishment of an appropriate value for the voltage Vgs allows a value of drain current Id to be restricted less than a constant value.

Here, it is noted that a flexible flat cable (FFC), which is generally employed for power supply to the steering wheel, has a low allowable current value. Thus, if only the voltage Vds is established so that the maximum of allowable current value does not exceed the drain current Id, then it is possible to exclude the possibility of abnormality in the FFC.

Further, for certain reasons, if the drain current Id is increased to change over from a load curve 1 (FIG. 2) representing the normal condition to a load curve 2, the operational area of the power MOSFET 4 is transferred from the linear area into the saturation area. Although an ON-resistance Rds existing between drain and source of the power MOSFET 4 is constant in the linear area, the same ON-resistance Rds increases in the saturation area. Consequently, the calorific value of the power MOSFET 4 is increased.

Nevertheless, the thermo-sensitive diode 5 of the embodiment can detect the temperature of the power MOSFET 4 rised by the above heat generation. Thus, even if a great current flows due to the occurrence of abnormality, for example, ground fault, the control part 8 can detect the presence of abnormality and cut off the flowing of current into the heater 2.

In this embodiment, the thermo-sensitive diode is illustrated as one example of thermo-sensitive element. In the modification, the thermo-sensitive diode may be replaced with any clement so long as it can detect temperature to change its characteristics, such as current and voltage. Besides, it should be noted that the thermo-sensitive diode 5 on illustration changes a voltage VF (between anode and cathode of diode) dependently of a temperature change only and the same diode 5 is not influenced by a voltage of the power source.

By integrating the thermo-sensitive diode 5 on polysilicon layer of the power MOSFET 4 through an electrically-insulating membrane having a high heat-conductivity, both of the power MOSFET 4 and the thermo-sensitive diode 5 are formed in one body, constructing a power semiconductor 15 with a built-in diode.

Upon detection of a voltage Vds between drain and source of the power MOSFET 4 by the drive-stop part 10, if the relationship of Vds=0[V] is maintained for a constant period, the drive-stop part 10 judges that a power-route for the heater 2 has been opened and further supplies the drive part 9 with a signal to stop the activation of the power MOSFET 4.

Consequently, it is possible to exclude a possibility of continuing to drive the power MOSFET 4 despite that the power-route for the heater 2 is being opened.

Additionally, the control part 8 generates an alarm signal to display a situation where the device has an abnormality in its displaying function. The device's history of warning is registered in a system controller (not shown) in order to provide a user and repairman with the device's information for repairing.

Again noted, the heater 2 is disposed in the steering wheel Sw. While, the control part 8, the power MOSFET 4, the thermo-sensitive diode 5, the drive part 9, etc. are all accommodated in a steering column Sc. As it can be supposed that the environment (especially temperature) about the steering wheel Sw is generally equal to the environment inside the steering column Sc, it is possible to accomplish the control of the steering-heater device in correspondence with the environment about the steering wheel.

Note, although the switch 14 may be exclusive to activate or inactivate (ON/OFF) the steering heater 2, an ignition switch (not shown) would take the same job providing that the device 1 is constructed so as to activate the steering heater 2 when the ignition switch is turned on.

Next, the operation of the steering-heater device 1 of the embodiment will be described with reference to a flow chart of FIG. 3.

In order to operate the steering-heater device 1, it is firstly carried out to supply a constant current (100 μA~500 μA) to the thermo-sensitive diode 5 by the constant-current circuit 6. Then, the voltage (between both sides) VF of the thermo-sensitive diode 5 is monitored by the voltage-detecting part (unit) 7.

In the steering-heater device 1 under the above conditions, when the switch 14 is turned on (step S301), an A/D converter 8a of the control part 8 receives the voltage VF (between both ends) of the thermo-sensitive diode 5 through the voltage-detecting part 7 thereby to detect an initial temperature of the steering wheel Sw (step S302).

At next step S303, it is judged whether the initial temperature of the steering wheel is within a range requiring to activate the heater 2 or not. If the judgment at step S303 is No, that is, outside of the above range, then the operation of the steering-heater device 1 of the embodiment is ended.

On the other hand, when the judgment at step S303 is Yes (within the range), then the routine goes to step 304 where the control part 8 calculates a consumption power necessary for the steering wheel Sw to reach a predetermined set temperature from the initial temperature.

In order to calculate the consumption power, it is previously executed to store a consumption power, which is necessary to rise a temperature from an optional temperature up to the set temperature, in a memory of the control part 8, as a table data. On establishment of such a condition, the actual consumption power is calculated with reference to the table data. Again, since the consumption power is determined by the ON resistance Rds of the power MOSFET 4 and the power voltage Vb, the transmission of a correction value of the voltage Vb corrected at the voltage-correcting part 11 to the control part 8 (shown with a dotted arrow of FIG. 1) allows of more precise control for temperature.

At step S305, by the so-calculated consumption power, it is executed to determine a heating period of the heater 2 necessary for the steering wheel to reach the set temperature. Then, the control part 8 measures a heating period by means of a timer 8c etc. and outputs a control signal to the drive part 9 for the heating period (step S306).

Although the heating period changes on a basis of the consumption power in the embodiment, the counting cycle of a timer counter may be altered dependently of the value of the voltage VF in the modification. In such a case, the heating period changes dependently of an action clock despite that the maximum number established in the timer 8c is constant. Consequently, it becomes possible to control an ON-period for the heater, that is, the consumption power of the heater by a value of the voltage VF.

On receipt of the control signal, the drive part 9 supplies the gate of the power MOSFET 4 with a voltage rised from the source voltage Vb of the power source 3, in the form of a drive signal. Thus, at step S307, the power MOSFET 4 is activated, so that the current from the power source 3 flows into the heater 3 for its heat-generation.

In this way, when the heater 2 begins heating and the current flows through the power MOSFET 4, the electric power is consumed by an ON-resistance existing between source and drain in the power MOSFET 4, so that its temperature is rised due to the above power consumption.

This elevation in temperature of the power MOSFET 4 causes the voltage VF (between both sides) of the thermo-sensitive diode to be changed. At step S309, by the control part 8, it is judged whether a change ΔVF becomes large in abnormality. If the judgment at step S309 is No, that is, the change ΔVF is within the range of normality, then the routine goes to step S310 where it is further judged whether the predetermined heating period has passed or not.

If the heating period has not passed yet (No at step S310), then the routine returns to step S309 to continue to heat the heater 2 while monitoring a value of ΔVF. On the other hand, when the heating period has passed (Yes at step S310), the routine goes to step S311 to stop the operation of the steering-heater device 1.

While, if the judgment at step S309 is Yes (abnormality), that is, the value of ΔVF becomes large excessively, then the routine goes to step S312 where the control part 8 stops generating the control signal and makes the heater 2 stop heating, on judgment of the heater 2 having a ground fault.

Then, the control part 8 produces an alarm signal to display a situation that the display function has an abnormality and further registers the history of warning in the system controller (not shown) in order to provide a user and repairman with the device's information for repairing.

After stopping the heating of the heater 2, it is repeatedly executed to judge whether the change ΔVF has an abnormal value or not, at step S313. When the temperature of the power MOSFET 4 is lowered to recover a normal value in the change ΔVF (No at step S314), the routine goes to step S314 to judge whether the heating period has passed or not. If the heating period has not passed yet (No at step S314), then the routine returns to step S306 where the control part 8 outputs the control signal to activate the heater 2 for its heating. On the other hand, when the heating period has already passed, the operation of the steering-heater device 1 is ended.

Figure 4A:
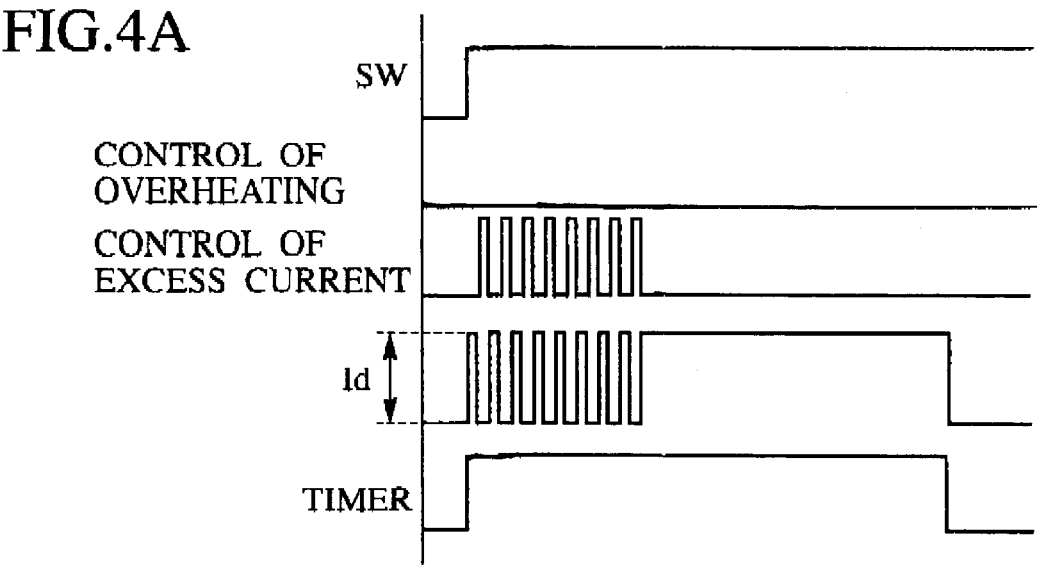
FIGS. 4A, 4B and 4C are timing charts for explanation of the heating control by a control part of FIG. 1.
Figure 4B:
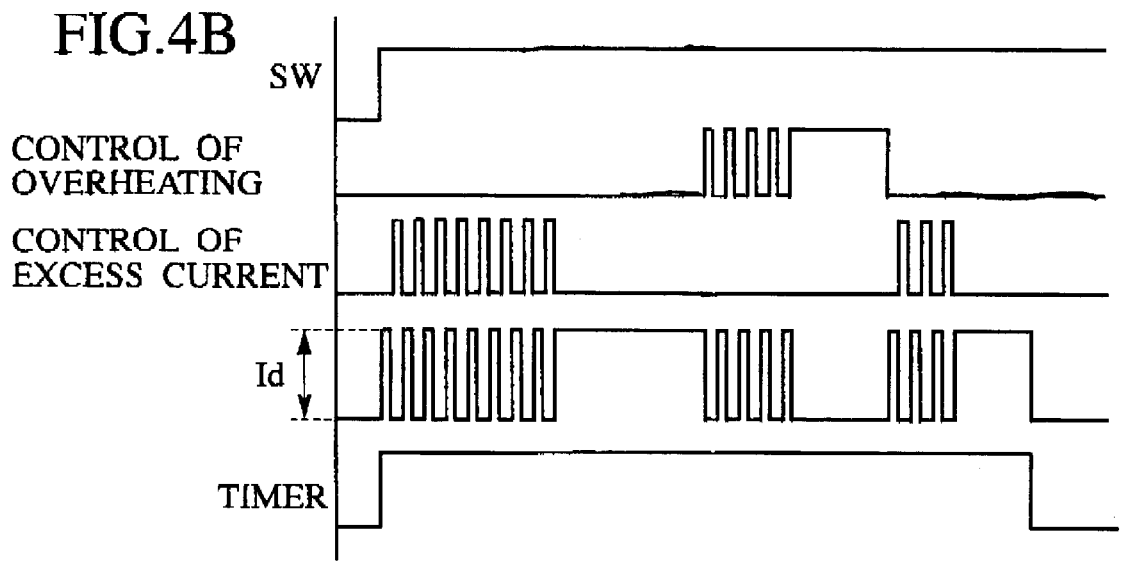
Figure 4C:
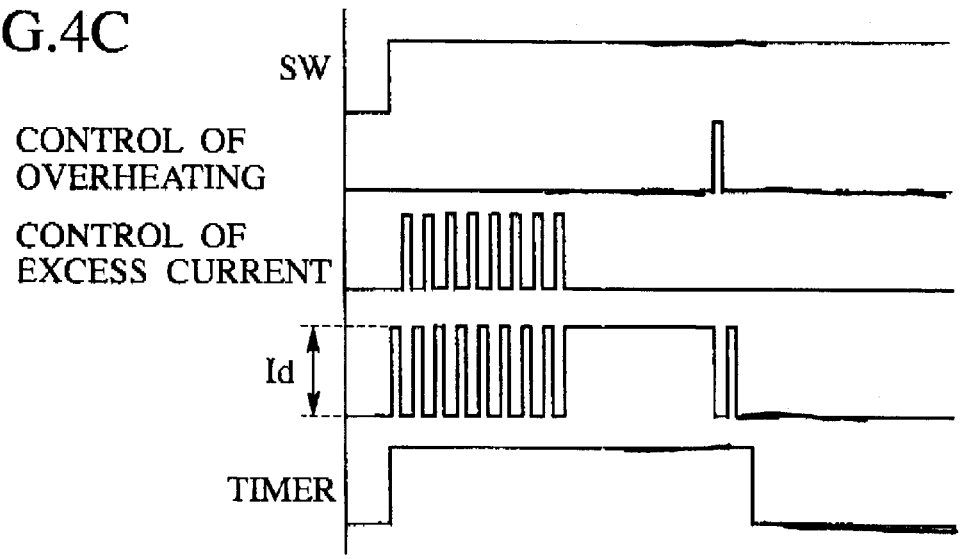

We now describe concrete examples of the heating control by the control part 8, with reference to FIGS. 4A, 4B and 4C.

First, FIG. 4A shows the normal operation of the steering-heater device 1 of the invention. In accordance with the normal operation on establishment, when the switch 14 is turned on, the timer 8c starts work with the flowing of a drain current Id. Then, as the flowing of drain current Id causes a voltage VF (between both sides) of the thermo-sensitive element 5 to be altered, the control of excess current is carried out by a comparator 8b in the control part 8. In detail, the outputs of the comparator 8b are switched between Hi-state and Lo-state alternately. Consequently, the gate-voltage of the power MOSFET 4 varies, so that the drain current Id flows intermittently (OFF and ON of flowing). Thereafter, as the passing of a constant period causes the output of the comparator 8b to be LO-state side, the drain current Id becomes constant.

At this time, since a value of drain current Id is restricted by the voltage Vgs (between gate and source) of the power MOSFET 4, the drain current Id has a maximum value within the current-limitation range.

When the heating period has passed, the timer 8c runs out to block the flowing of drain current Id, so that the heating operation of the heater 2 is completed.

Next, with reference to FIG. 4B, the overheating-protective operation of the device 1 will be described below.

As similar to the normal operation of FIG. 4A, at first, the switch 14 is turned on to perform the excess-current control. After completing the excess-current control, the value of current Id becomes constant to start the heating operation by the heater 2. If the temperature of the power MOSFET 4 is rised during this heating operation and consequently, it is judged that the change ΔVF has an abnormal value thereby to start the overheating control, the outputs of the comparator 8b are switched between Hi-state and Lo-state alternately. Consequently, the gate-voltage of the power MOSFET 4 varies, so that the drain current Id flows intermittently (OFF and ON of flowing).

When the voltage VF becomes lower than a standard value, the output of the comparator 8b exhibits its Hi-state to effect the overheating control, interrupting the flowing of current Id.

With the passage of time, when the temperature of the power MOSFET 4 is lowered so that the voltage VF becomes less than the standard value and if the timer 8c has not run out yet, then the excess-current control is carried out and thereafter, the drain current Id begins to flow.

Subsequently, when the timer 8c runs out with the expiry of the heating period, the heating of the heater 2 is ended.

FIG. 4C shows the control in case that the timer 8c runs out to finish the heating of the heater 2 just when the overheating control is started.

In this case, the flowing of the drain current Id is interrupted by the run-out of the timer 8c in spite of the start of overheating control, In this way, since the steering-heater device 1 of this embodiment has the power MOSFET 4 disposed in the steering column to control the drive current for the heater 2, it is possible to cut off the flowing of excess current in the steering column, whereby it is also possible to prevent an excess current from flowing into the steering wheel.

Accordingly, it is possible to exclude a possibility that the FFC connecting the steering wheel with a column switch (not shown) has an abnormality.

Additionally, since the drive-stop part 10 detects the voltage Vd (between drain and source) of the power MOSFET 4 and further stops its drive when the relationship of Vds=0[V] is established for a constant period, it is possible to exclude the possibility of going on driving the power MOSFET 4 despite that the route for the heater 2 is opened.

Further, since the voltage Vgs (between gate and source) of the power MOSFET 4 is established so that the drive current becomes less than an allowable current of the FFC, it is possible to prevent an excess current from flowing into the steering wheel.

That is, it is also possible to exclude a possibility that the FFC connecting the steering wheel with the column switch (not shown) has an abnormality.

As mentioned above, according to the invention, it is possible to carry out the temperature control without causing an excess current to flow into the steering wheel.

The scope of the invention is defined with reference to the following claims.

What is claimed is:

1. A steering-heater device for vehicle, comprising:

a heater disposed in a steering wheel of vehicle;

a calorific switching element connected to the heater electrically and arranged in a steering column to switch the flowing of a drive current for driving the heater, the calorific switching element generating heat by the drive current;

a thermo-sensitive element arranged adjacent to the calorific switching element to sense a temperature of the calorific switching element thereby to change characteristics of the thermo-sensitive element;

a control unit connected to the thermo-sensitive element to detect an initial temperature of the steering wheel on a basis of a change in the characteristics of the thermo-sensitive element, the control unit further calculating a consumption power necessary to rise a temperature of the steering wheel from the initial temperature to a predetermined temperature and also outputting a control signal for a heating period determined on a basis of the consumption power; and a drive unit connected to the control unit to output a drive signal to drive the calorific switching element on a basis of the control signal outputted from the control unit.

2. The steering-heater device as claimed in claim 1, further comprising a drive-stop unit which detects a voltage drop of the calorific switching element due to the flowing of the drive current and makes the driving of the calorific switching element stop when no voltage drop is detected.

3. The steering-heater device as claimed in claim 1, wherein the calorific switching element is a power MOSFET where a voltage between gate and source thereof is established so that the drive current becomes less than a current limit for the heater.

4. The steering-heater device as claimed in claim 1, further comprising a voltage detecting unit connected to the thermo-sensitive element and the control unit thereby to detect a voltage between both ends of the thermo-sensitive element, wherein the characteristics of the thermo-sensitive element is identical to the voltage between both ends of the thermo-sensitive element.

5. The steering-heater device as claimed in claim 4, wherein the thermo-sensitive element is a thermo-sensitive diode through which a constant current flows and which senses the temperature of the calorific switching element thereby to change the voltage between both ends of the thermo-sensitive diode.

6. The steering-heater device as claimed in claim 5, wherein the power MOSFET and the thermo-sensitive element are formed into one body thereby to provide a power semiconductor having at built-in diode.

7. The steering-heater device as claimed in claim 1, wherein the heater is connected to the calorific switching element through a flexible flat cable.

* * * * *